United States Patent
Sasaki et al.

(10) Patent No.: US 10,746,664 B2
(45) Date of Patent: Aug. 18, 2020

(54) IMAGING APPARATUS FOR OBTAINING IMAGE OF POLARIZING FILM, INSPECTION APPARATUS, AND INSPECTION METHOD

(71) Applicants: NITTO DENKO CORPORATION, Ibaraki-shi, Osaka (JP); UTSUNOMIYA UNIVERSITY, Utsunomiya-shi, Tochigi (JP)

(72) Inventors: Shunsuke Sasaki, Ibaraki (JP); Ichiro Suehiro, Ibaraki (JP); Shuhei Shibata, Utsunomiya (JP); David Ignacio Serrano Garcia, Utsunomiya (JP); Yukitoshi Otani, Utsunomiya (JP)

(73) Assignees: NITTO DENKO CORPORATION, Osaka (JP); UTSUNOMIYA UNIVERSITY, Utsunomiya-shi (JP)

( * ) Notice: Subject to any disclaimer, the term of this patent is extended or adjusted under 35 U.S.C. 154(b) by 0 days.

(21) Appl. No.: 16/049,294

(22) Filed: Jul. 30, 2018

(65) Prior Publication Data
US 2019/0033226 A1 Jan. 31, 2019

(30) Foreign Application Priority Data
Jul. 31, 2017 (JP) ................. 2017-148174

(51) Int. Cl.
*G01N 21/88* (2006.01)
*G01N 21/19* (2006.01)
(Continued)

(52) U.S. Cl.
CPC ......... *G01N 21/8806* (2013.01); *G01N 21/19* (2013.01); *G01N 21/21* (2013.01);
(Continued)

(58) Field of Classification Search
CPC .. G01N 21/8806; G01N 21/896; G01N 21/21; G01N 21/8422; G01N 21/958;
(Continued)

(56) References Cited

U.S. PATENT DOCUMENTS

| 5,666,199 A | 9/1997 | Hess et al. |
| 5,948,487 A * | 9/1999 | Sahouani ............. C07D 401/04 428/1.3 |

(Continued)

FOREIGN PATENT DOCUMENTS

| CN | 106442538 A | 2/2017 |
| JP | 2007-212442 A | 8/2007 |

(Continued)

OTHER PUBLICATIONS

Office Action dated Jun. 28, 2019, issued in counterpart JP Application No. 2017-148174, with English translation (14 pages).

*Primary Examiner* — Mohamed K Amara
(74) *Attorney, Agent, or Firm* — Westerman, Hattori, Daniels & Adrain, LLP

(57) ABSTRACT

Provided are a polarizing film imaging apparatus, a polarizing film inspection apparatus including the imaging apparatus, and a polarizing film inspection method using the imaging apparatus. The imaging apparatus includes: a light source that is configured to emit light toward a polarizing film to be inspected; an imaging unit that is arranged on an optical axis of the light source and on an opposite side to the light source with the polarizing film therebetween; and at least one of a circular polarizing plate arranged between the light source and the polarizing film, and a wavelength plate arranged between the polarizing film and the imaging unit.

5 Claims, 7 Drawing Sheets

(51) Int. Cl.
*G01N 21/958* (2006.01)
*G01N 21/84* (2006.01)
*G02B 5/30* (2006.01)
*G01N 21/21* (2006.01)
*G01N 21/896* (2006.01)
*G01N 21/23* (2006.01)

(52) U.S. Cl.
CPC ....... *G01N 21/8422* (2013.01); *G01N 21/896* (2013.01); *G01N 21/958* (2013.01); *G02B 5/3025* (2013.01); *G01N 21/23* (2013.01); *G01N 2021/216* (2013.01); *G01N 2021/8848* (2013.01); *G02B 5/3083* (2013.01)

(58) Field of Classification Search
CPC .. G01N 21/19; G01N 21/23; G01N 2021/216; G01N 2021/8848; G01N 21/95; G02B 5/3025; G02B 5/3083
See application file for complete search history.

(56) References Cited

U.S. PATENT DOCUMENTS

| | | | | |
|---|---|---|---|---|
| 6,011,626 A * | 1/2000 | Hielscher | | G01N 21/21 356/364 |
| 6,266,141 B1 * | 7/2001 | Morita | | G01J 4/04 356/365 |
| 6,650,410 B2 * | 11/2003 | Shimoda | | G01N 21/23 356/239.1 |
| 6,678,632 B1 * | 1/2004 | Iannarilli, Jr. | | G01N 21/21 702/153 |
| 7,428,050 B2 * | 9/2008 | Giakos | | G01J 3/02 356/364 |
| 7,499,175 B1 * | 3/2009 | Palmer | | G02B 26/001 356/450 |
| 7,701,561 B2 * | 4/2010 | Zou | | G01N 21/21 356/73 |
| 7,850,801 B2 | 12/2010 | Kobayashi et al. | | |
| 7,889,339 B1 * | 2/2011 | Flock | | G01N 21/211 356/364 |
| 9,068,928 B2 * | 6/2015 | Kudenov | | G01N 21/21 |
| 9,846,928 B2 * | 12/2017 | Ogawa | | G06T 7/0004 |
| 9,874,526 B2 * | 1/2018 | Liu | | G01N 21/21 |
| 9,970,860 B2 | 5/2018 | Murayama et al. | | |
| 10,036,714 B2 * | 7/2018 | Ogawa | | G01N 21/8806 |
| 10,215,642 B2 * | 2/2019 | Giakos | | G01J 4/04 |
| 10,371,625 B1 * | 8/2019 | Twede | | G01S 17/88 |
| 2004/0012853 A1 * | 1/2004 | Garcia | | G02B 21/008 359/489.07 |
| 2004/0125375 A1 * | 7/2004 | Some | | G01N 21/211 356/369 |
| 2006/0056029 A1 * | 3/2006 | Ye | | G02B 27/288 359/578 |
| 2007/0052953 A1 * | 3/2007 | Hill | | G01N 21/4738 356/237.2 |
| 2007/0070337 A1 * | 3/2007 | Ohshima | | G01N 21/21 356/237.3 |
| 2009/0009864 A1 * | 1/2009 | Kobayashi | | G01N 21/958 359/485.02 |
| 2009/0028875 A1 | 1/2009 | Emilie et al. | | |
| 2009/0288754 A1 | 11/2009 | Kobayashi et al. | | |
| 2012/0182551 A1 * | 7/2012 | Lo | | G01J 4/00 356/364 |
| 2012/0212742 A1 * | 8/2012 | Lo | | G01J 4/04 356/364 |
| 2013/0100333 A1 * | 4/2013 | Awatsuji | | G01N 21/21 348/335 |
| 2016/0313185 A1 * | 10/2016 | Ma | | G01J 4/04 |
| 2017/0146463 A1 * | 5/2017 | Honda | | G01N 21/9501 |
| 2017/0176323 A1 | 6/2017 | Murayama et al. | | |
| 2017/0276597 A1 * | 9/2017 | Emoto | | G01N 21/23 |

FOREIGN PATENT DOCUMENTS

| | | |
|---|---|---|
| JP | 2013-15442 A | 1/2013 |
| JP | 2013-50381 A | 3/2013 |
| JP | 2014-119255 A | 6/2014 |
| JP | 2017-116294 A | 6/2017 |

* cited by examiner

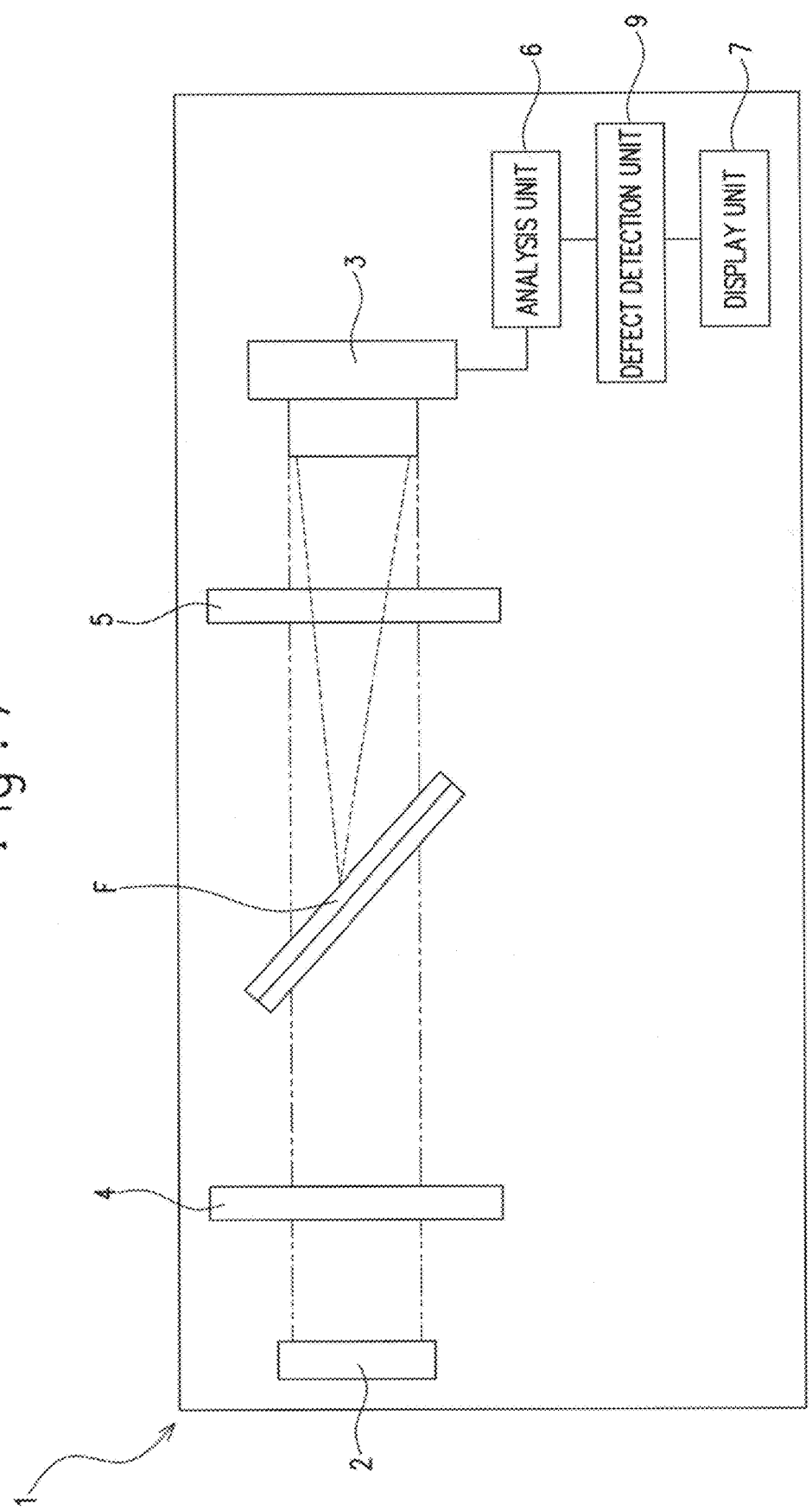

IMAGING APPARATUS FOR OBTAINING IMAGE OF POLARIZING FILM, INSPECTION APPARATUS, AND INSPECTION METHOD

CROSS-REFERENCE TO RELATED APPLICATION

This application claims priority to Japanese Patent Application No. 2017-148174, filed on Jul. 31, 2017, the disclosure of which is incorporated herein by reference in its entirety.

BACKGROUND OF THE INVENTION

Field of the Invention

The present invention relates to an imaging apparatus for capturing polarizing characteristics of a polarizing film, an inspection apparatus including the imaging apparatus, and an inspection method using the imaging apparatus.

Background Art

There has been conventionally provided an inspection apparatus for inspecting a polarizing film that allows light polarized in a certain direction to pass therethrough. The inspection apparatus is incorporated with an imaging apparatus that captures polarizing characteristics of a polarizing film.

For example, an imaging apparatus incorporated in an inspection apparatus (defect detection apparatus) disclosed in JP 2007-212442 A includes a light source 2 that irradiates a polarizing film with light, an imaging unit that is arranged to be aligned with the light source 2 with the polarizing film therebetween in the light path of the light from the light source 2 and is configured to capture an image of the transmitted light of the polarizing film, and a polarizing filter and a phase difference filter that can be arranged at any positions between the polarizing film and the imaging unit in the light path.

According to the aforementioned imaging apparatus, an imaging environment suitable for capture an image of the polarizing film can be built by the arrangement of the polarizing film and the phase difference filter, which is changed according to a polarizing film to be inspected.

SUMMARY OF THE INVENTION

There are some cases where only a small difference exists between the polarizing characteristics of light having passed through an area of the polarizing film where a defect is caused and the polarizing characteristics of light having passed through an area surrounding the area of the defect (that is, an area where no defect is caused). This may result in difficulty to allow a defect of the polarizing film to appear in an image and hence cause detection failure of the defect in the imaging apparatus.

In view of the above circumstances, it is an object of the present invention to provide an imaging apparatus that is capable of capture an image with a defect of a polarizing film emphasized, an inspection apparatus including the imaging apparatus, and an inspection method using the imaging apparatus.

According to the present invention, there is provided a polarizing film imaging apparatus, which includes: a light source that is configured to emit light toward a polarizing film to be inspected; an imaging unit that is arranged on an optical axis of the light source and on an opposite side to the light source with the polarizing film therebetween; and at least one of a circular polarizing plate arranged between the light source and the polarizing film, and a wavelength plate arranged between the polarizing film and the imaging unit.

The wavelength plate may be configured to shift the phase of incident light by ¼ wavelength in the imaging apparatus of the present invention.

The polarizing film may be arranged to be inclined to the optical axis in the imaging apparatus of the present invention.

The light of the light source may have a wavelength of 400 nm to 500 nm, or 700 nm to 1000 nm in the imaging apparatus of the present invention.

According to another aspect of the present invention, there is provided a polarizing film inspection apparatus including: any one of the aforesaid imaging apparatuses; and a defect detection unit that is configured to detect a defect of the polarizing film appearing in an image of the polarizing film captured by the imaging apparatus.

According to still another aspect of the present invention, there is provided a polarizing film inspection method including: obtaining an image of a polarizing film using any one of the aforesaid imaging apparatuses; and detecting a defect of the polarizing film appearing in the image of the polarizing film captured by the imaging apparatus.

BRIEF DESCRIPTION OF THE DRAWINGS

FIG. 7 is a block diagram of a polarizing film imaging apparatus according to yet another embodiment of the present invention.

DETAILED DESCRIPTION OF THE PREFERRED EMBODIMENTS

Hereinafter a polarizing film imaging apparatus (hereinafter referred to as the imaging apparatus) according to one embodiment of the present invention will be described with reference to the attached drawings.

Figure 1:
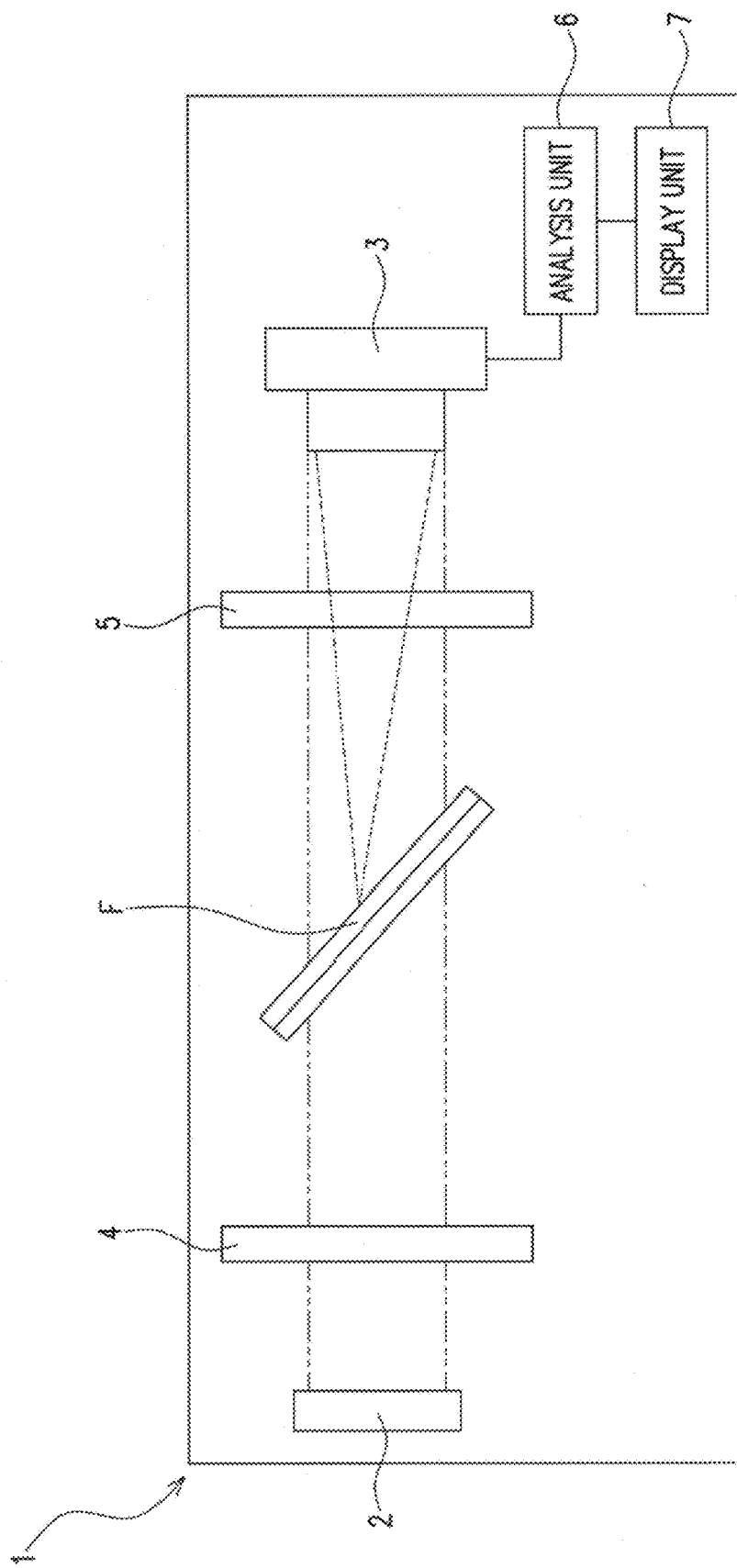
FIG. 1 is a block diagram of a polarizing film imaging apparatus according to one embodiment of the present invention.

As shown in FIG. 1, an imaging apparatus 1 according to this embodiment includes: a light source 2 that is configured to emit light toward a polarizing film F to be inspected; an imaging unit 3 that is arranged on an optical axis of the light source 2 and on an opposite side to the light source 2 with the polarizing film F therebetween; a circular polarizing plate 4 arranged between the light source 2 and the polarizing film F; a wavelength plate 5 arranged between the polarizing film F and the imaging unit 3; an analysis unit 6 that is configured to analyze information of an image captured by the imaging unit 3; and a display unit 7 that is configured to display an analysis result of the analysis unit 6.

The light source 2 is configured to generate light having a short wavelength. The wavelength of the light source is set according to the kind of the polarizing film F. When an inspection subject is, for example, the polarizing film F, the wavelength of the light source 2 is preferably set within a range of 400 nm to 500 nm. When an inspection subject is a polarizing film F having a surface subjected to non-glare treatment (that is, a polarizing film F having a glare-proof function), the wavelength of the light source 2 is preferably set within a range of 700 nm to 1000 nm.

The imaging unit 3 is configured to obtain polarization information of a captured subject image (i.e., the polarizing film F to be inspected) (specifically, information on polarized light beam having a certain azimuth angle). The imaging unit 3 of this embodiment is constituted by a polarization camera. The imaging unit 3 is configured to obtain, as polarization information, information on polarized light beams having azimuth angles of 0°, 45°, 90°, and 135°.

The circular polarizing plate 4 is configured to extract circularly polarized light from light of the light source 2. The circularly polarized light extracted by the circular polarizing plate 4 may be either right-handed or left-handed. Because of this, the polarizing film F that is an inspection subject is irradiated with circularly polarized light.

The circular polarizing plate 4 is arranged so as to cross an optical axis of the light source 2. The direction in which each surface of the circular polarizing plate 4 expands is orthogonal to the direction in which the optical axis of the light source 2 extends (hereinafter referred to as the "optical axis direction").

The polarizing film F as an inspection subject may be constituted by a polarizer only, or a composite film with a polarizer and a retarder bonded together. The polarizing film F that is an inspection subject may have a surface subjected to anti-reflection treatment or non-glare treatment. In this embodiment, a composite film with a polarizer and a retarder bonded together is served as an inspection subject. A retarder of the composite film is arranged to face the imaging unit 3 side. The polarizer of the composite film is arranged to face the light source 2 side. The polarizer and the retarder may be of a flat plate shape having a fixed form nature or a film shape having a flexible nature.

This embodiment will be hereinbelow described with the polarizing film F as the inspection subject being referred to as the "inspection film F".

The inspection film F is arranged to cross the optical axis of the light source 2, and each surface of the inspection film F crosses the optical axis while being inclined to the optical axis.

The inspection film F according to this embodiment is arranged to be inclined to both the optical axis direction and the vertical direction. The inclination angle of the inspection film F relative to the vertical direction is preferably set within a range of 0° to 60° and more preferably set at 45°.

The inspection film F according to this embodiment is inclined so as to have its upper end closer to the light source 2 than its lower end.

The wavelength plate 5 is configured to shift the phase of incident light (i.e., light having passed through the inspection film F). The wavelength plate 5 of this embodiment is configured to shift the phase of incident light by ¼ wavelength.

While the incident light to the wavelength plate 5 is circularly polarized light, the emission light having passed through the wavelength plate 5 turns to be linearly polarized light. Accordingly, the linearly polarized light having passed through the wavelength plate 5 is imaged by the imaging unit 3 in the imaging apparatus 1. Thus, the light of the light source 2 which has been processed into state appropriate for image capturing is irradiated to the imaging unit 3.

The light which has been emitted from the light source 2 and reached the imaging unit 3 through the circular polarizing plate 4, the inspection film F and the wavelength plate 5 involves changes in the light intensity due to circular dichroism and birefringence.

More specifically, stokes parameter, which represents the polarization state of light reaching the imaging unit 3 is determined from Formula 1 shown below, where the stokes parameter of the circular polarizing plate 4 is $S_c$, the Mueller matrix of the inspection film F is $M_f$, and the Mueller matrix of the wavelength plate 5 is $M_w$.

$$S = M_w \times M_f \times S_c \quad \text{Formula 1}$$

In this embodiment, the stokes parameter $S_c$ of the circular polarizing plate 4, the Mueller matrix $M_f$ of the inspection film F, and the Mueller matrix Mw of the wavelength plate 5 are respectively represented as follows:

$$S_c = \begin{bmatrix} 1 \\ 0 \\ 0 \\ 1 \end{bmatrix}$$

$$M_f = \begin{bmatrix} M_{00} & M_{01} & M_{02} & M_{03} \\ M_{10} & M_{11} & M_{12} & M_{13} \\ M_{20} & M_{21} & M_{22} & M_{23} \\ M_{30} & M_{31} & M_{32} & M_{33} \end{bmatrix}$$

$$M_w = \begin{bmatrix} 1 & 0 & 0 & 0 \\ 0 & 0 & 0 & -1 \\ 0 & 0 & 1 & 0 \\ 0 & 1 & 0 & 0 \end{bmatrix}$$

Therefore, the stokes parameter S of light reaching the imaging unit 3 is represented by Formula 2 shown below.

$$S = \begin{bmatrix} 1 & 0 & 0 & 0 \\ 0 & 0 & 0 & -1 \\ 0 & 0 & 1 & 0 \\ 0 & 1 & 0 & 0 \end{bmatrix} \begin{bmatrix} M_{00} & M_{01} & M_{02} & M_{03} \\ M_{10} & M_{11} & M_{12} & M_{13} \\ M_{20} & M_{21} & M_{22} & M_{23} \\ M_{30} & M_{31} & M_{32} & M_{33} \end{bmatrix} \begin{bmatrix} 1 \\ 0 \\ 0 \\ 1 \end{bmatrix} = \quad \text{Formula 2}$$

$$\begin{bmatrix} M_{00} - M_{03} \\ M_{30} - M_{33} \\ M_{20} - M_{23} \\ M_{10} - M_{13} \end{bmatrix}$$

As a result, the circular dichroism is emphasized in $S_0$ component of the stokes parameter S and the birefringence is emphasized in $S_1$ component of the same in the light reaching the imaging unit 3.

Figure 2:
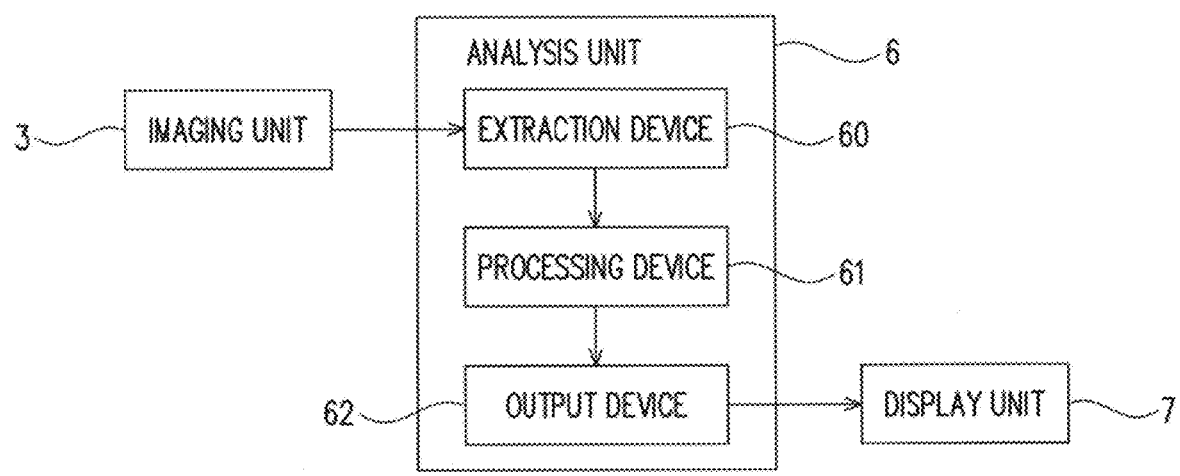
FIG. 2 is a block diagram of an analysis unit of the polarizing film imaging apparatus according to the embodiment.

As shown in FIG. 2, the analysis unit 6 includes an extraction device 60 that extracts characteristics information representing the polarization characteristics from the polarization information obtained by the imaging unit 3, a processing device 61 that processes the characteristics information extracted by the extraction device 60, and an output device 62 that outputs the results of the processing of the characteristics information by the processing device 61 to the display unit 7.

The analysis unit 6 can be constituted by a machine or instrument (e.g., a personal computer) including, for example, a CPU for processing information, and a storage device for storing information, and may be connected wirelessly or by wire to the imaging unit 3.

The extraction device 60 is configured to extract, as the characteristics information, light intensity of an image captured by the imaging unit 3, the difference in light intensity between the horizontal linearly polarized light and the vertical linearly polarized light, and the difference in light intensity between 45° linearly polarized light and 135° linearly polarized light. The extraction device 60 may be configured to be able to extract, as the characteristics information, the difference in light intensity between the right-handed circularly polarized light and the left-handed circularly polarized light.

The processing device 61 is configured to newly generate an image (inspection image) which is produced by capturing an image of the inspection film F on the basis of the characteristics information extracted by the extraction device 60. The processing device 61 may be configured to generate an inspection image on the basis of, for example, the light intensity and the intensity of the horizontal linearly polarized light.

The output device 62 outputs an inspection image generated by the processing device 61 to the display unit 7. The display unit 7 is constituted by a display device, such as a display. Therefore, an inspection operator can see whether there is irregularity of the inspection film F (i.e., a defect causing partial change of the polarization characteristics), the kind of irregularity or the like by checking an inspection image outputted to the display unit 7 by the output device 62.

A method for inspecting the polarizing film F may be realized by capturing an image of the inspection film F by the imaging apparatus 1, and detecting irregularity (defect) of the polarizing film appearing in the image of the inspection film F captured by the imaging apparatus 1.

As described above, according to the imaging apparatus 1 of this embodiment, the light of the light source 2 reaches the imaging unit 3 while its polarization characteristics (circular dichroism and birefringence in this embodiment) are emphasized according to the arrangement of the circular polarizing plate 4, the inspection film F and the wavelength plate 5, because the circular polarizing plate 4, the inspection film F and the wavelength plate 5 are arranged between the light source 2 and the imaging unit 3.

Therefore, the imaging apparatus 1 can make a great difference between the polarization characteristics of the light having passed through irregularity (defect) of the inspection film F and the polarization characteristics of the light having passed through a periphery of the irregularity of the inspection film F. Thus, the imaging apparatus 1 can obtain the image of the inspection film F with irregularity clearly appearing therein.

In this embodiment, the inspection film F is arranged while being inclined to the optical axis so that the distance by which the light from the light source must travel to pass through the inspection film F is increased. Because of this, the polarization characteristics of the inspection film F is emphasized. Accordingly, when irregularity has occurred in the inspection film F, the irregularity appearing in the image of the inspection film F is easy to be emphasized in the imaging apparatus.

In this embodiment, the processing device 61 is configured to newly generate an inspection image on the basis of the characteristics information received by the extraction device 60 (i.e., light intensity, difference in light intensity between the horizontal linearly polarized light and the vertical linearly polarized light, and difference in light intensity between 45° linearly polarized light and 135° linearly polarized light). Thus, when an $M_{03}$ component of the Mueller matrix $M_f$ of the inspection film F is contained in $S_0$ component of the stokes parameter of light reaching the imaging unit 3, changes in light intensity of the inspection film F caused by the circular dichroism appear remarkably in the inspection image. Therefore, irregularity, in which variations in light intensity are caused due to the circular dichroism, appears in the inspection image while being emphasized.

When $M_{33}$ component of the Mueller matrix $M_f$ of the inspection film F is contained in $S_1$ component of the stokes parameter of light reaching the imaging unit 3, changes in light intensity of the inspection film F caused by the birefringence appear remarkably in the inspection image. Therefore, irregularity, in which variations in light intensity are caused due to the birefringence, appears in the inspection image while being emphasized.

Irregularity, in which variations in light intensity are caused due to the circular dichroism, is, for example, spot irregularity and oblique irregularity. Spot irregularity is a defect such as interference irregularity caused in spot manner, and oblique irregularity is thickness irregularity caused in a retarder in oblique manner.

Irregularity, in which variations in light intensity are caused due to the birefringence, is, for example, density irregularity (i.e., phase irregularity) caused in a polarizing film (PVA) in vertical streak manner.

Thus, the imaging apparatus 1 of this embodiment can obtain an inspection image, in which irregularity affecting on the polarization characteristics is emphasized, by emphasizing a certain polarization characteristic of light reaching the imaging unit 3.

It is a matter of course that the imaging apparatus 1 of the present invention is not necessarily limited to the above embodiment, and may be subjected to various modifications within the gist of the present invention.

According to the above embodiment, the imaging unit 3 is configured to be able to capture images of polarized light beams having azimuth angles of 0°, 45°, 90°, and 135°; however, it may be configured to be able to capture an image of polarized light beams having an azimuth angle of at least 45°.

Figure 3:
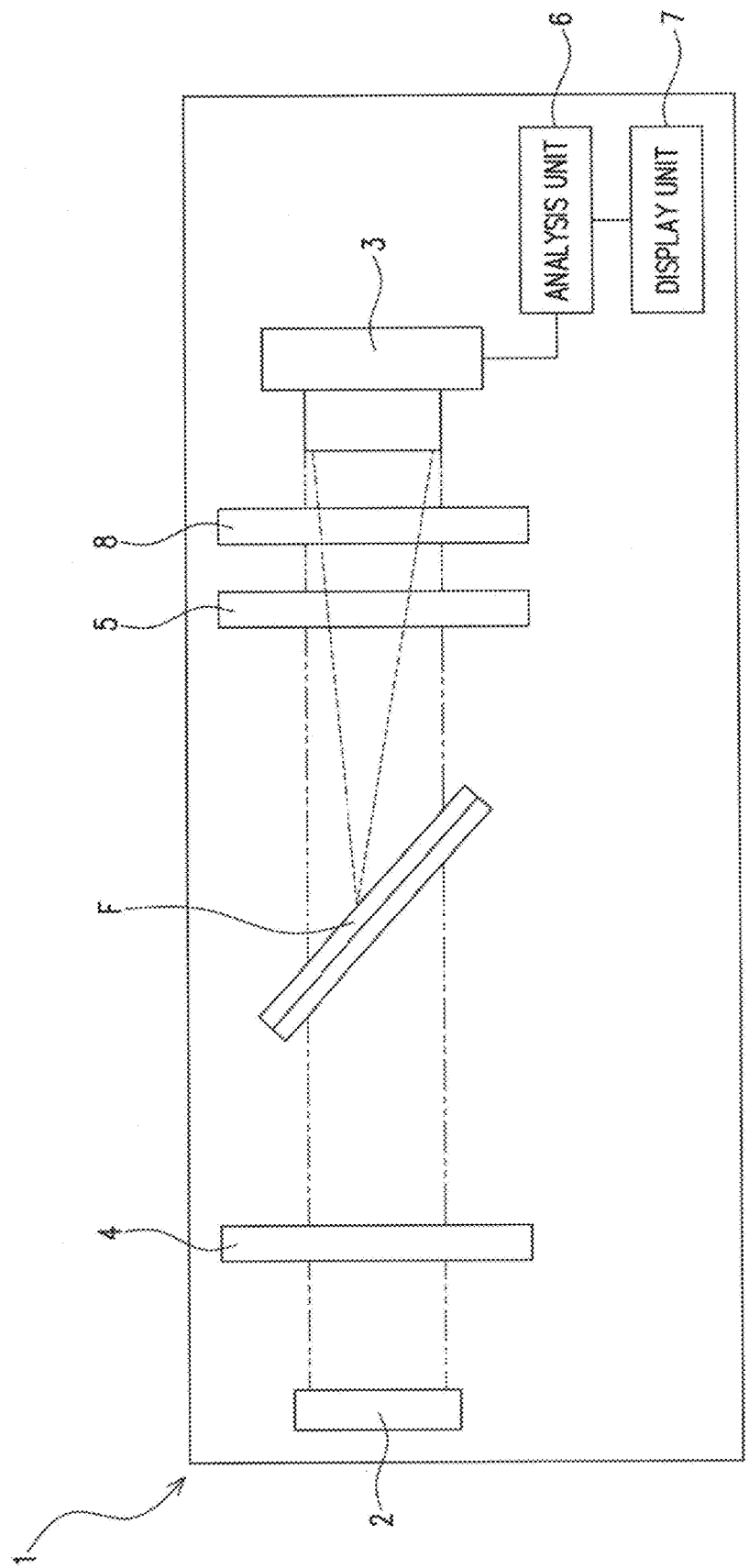
FIG. 3 is a block diagram of a polarizing film imaging apparatus according to another embodiment of the present invention.
Figure 4:
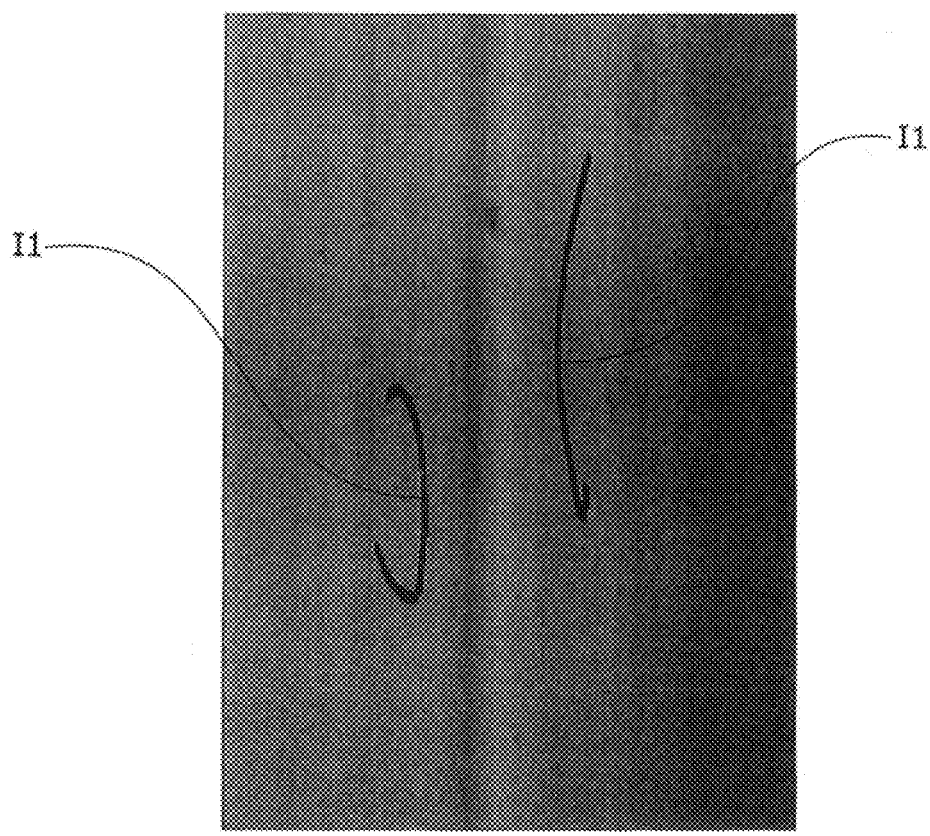
FIG. 4 is a view of an image captured by the polarizing film imaging apparatus according to the other embodiment.

When the imaging unit 3 is configured to capture an image of, for example, only the polarized light beam having an azimuth angle of 45°, a polarizing plate 8 that allows polarized light beams having an azimuth angle of 45° to be passed therethrough may be arranged between the wavelength plate 5 and the imaging unit 3, as shown in FIG. 3. In this case, the imaging unit 3 may be constituted not by a polarizing camera, but a camera, such as a line camera having no function to obtain polarization information. In the imaging apparatus 1 shown in FIG. 3, only $M_{33}$ component out of $M_{30}$ component and $M_{33}$ component of the Mueller matrix $M_f$ of the inspection film F is contained in $S_0$ component of the stokes parameter of light reaching the imaging unit 3, so that an inspection image (see FIG. 4) with irregularity, in which variations in light intensity due to the birefringence, is emphasized, is obtained. In FIG. 4, a reference code "11" is allocated to portions corresponding to irregularity.

In the above embodiment, the imaging apparatus 1 includes the circular polarizing plate 4 arranged between the light source 2 and the polarizing film F, and the wavelength plate 5 arranged between the polarizing film F and the imaging unit 3; however the present invention is not necessarily limited to this configuration. For example, the imaging apparatus 1 may include at least one of the circular polarizing plate 4 and the wavelength plate 5.

Figure 5:
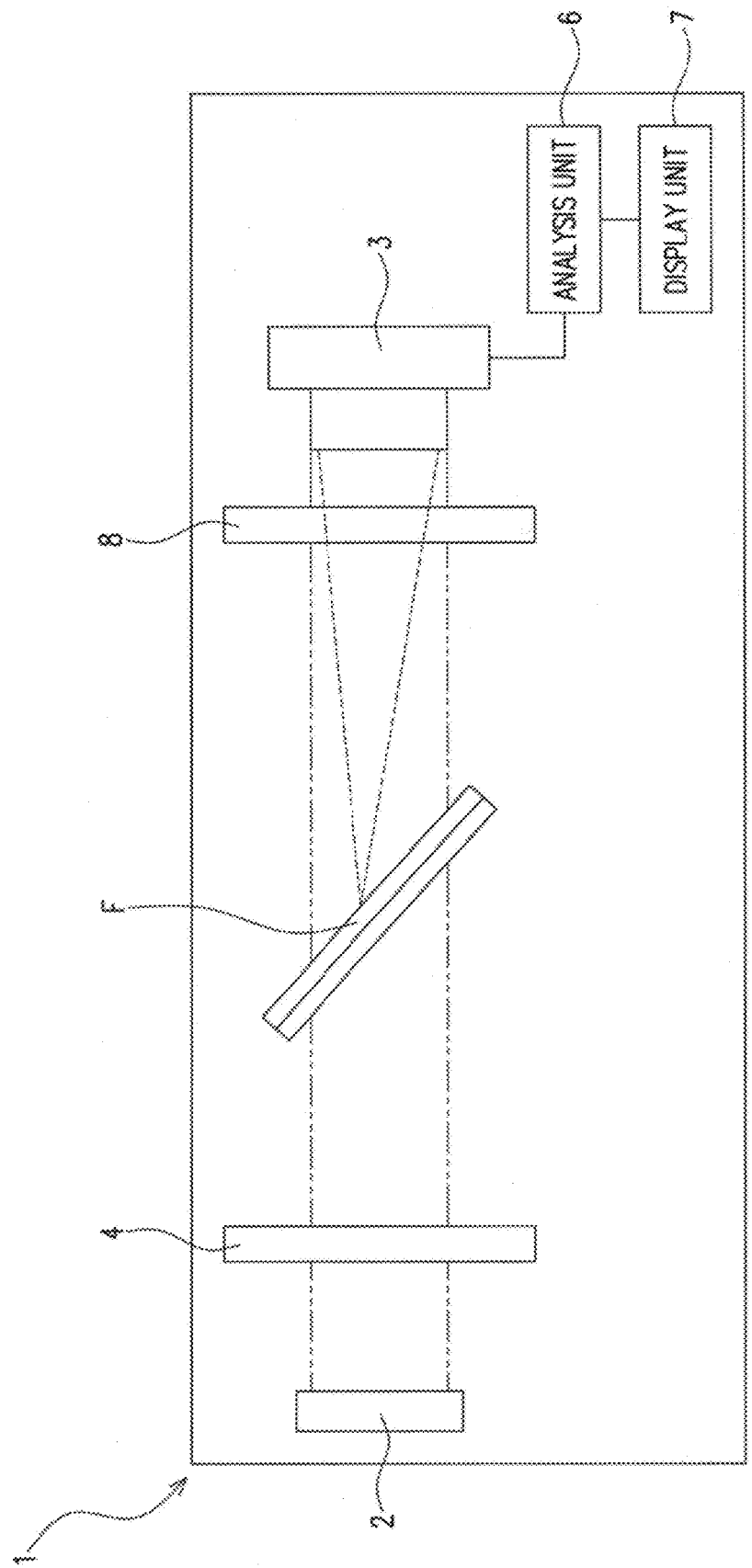
FIG. 5 is a block diagram of a polarizing film imaging apparatus according to still another embodiment of the present invention.

The imaging apparatus 1 shown in FIG. 5 includes only the circular polarizing plate 4 out of the circular polarizing plate 4 and the wavelength plate 5. A camera having no function to obtain polarization information is used for the imaging unit 3, so that the polarizing plate 8, which allows polarized light beams having an azimuth angle of −45°, is arranged between the inspection film F and the imaging unit 3.

In this case, stokes parameter S, which represents the polarization state of light reaching the imaging unit 3 is represented by Formula 3 shown below, where the stokes parameter of the circular polarizing plate 4 is $S_c$, the Mueller matrix of the inspection film F is $M_f$, and the Mueller matrix of the polarizing plate 8 is Mp.

$$S = M_p \times M_f \times S_c \quad \text{Formula 3}$$

In the imaging apparatus 1 shown in FIG. 5, the stokes parameter $S_c$ of the circular polarizing plate 4, the Mueller matrix $M_f$ of the inspection film F, and the Mueller matrix Mp of the polarizing plate 8 are respectively represented as follows:

$$S_c = \begin{bmatrix} 1 \\ 0 \\ 0 \\ 1 \end{bmatrix}$$

$$M_f = \begin{bmatrix} M_{00} & M_{01} & M_{02} & M_{03} \\ M_{10} & M_{11} & M_{12} & M_{13} \\ M_{20} & M_{21} & M_{22} & M_{23} \\ M_{30} & M_{31} & M_{32} & M_{33} \end{bmatrix}$$

$$M_w = \begin{bmatrix} 1 & 0 & -1 & 0 \\ 0 & 0 & 0 & 0 \\ -1 & 0 & 1 & 0 \\ 0 & 0 & 0 & 0 \end{bmatrix}$$

Therefore, the stokes parameter S of light reaching the imaging unit 3 is represented by Formula 4 shown below.

$$S = \begin{bmatrix} 1 & 0 & -1 & 0 \\ 0 & 0 & 0 & 0 \\ -1 & 0 & 1 & 0 \\ 0 & 0 & 0 & 0 \end{bmatrix} \begin{bmatrix} M_{00} & M_{01} & M_{02} & M_{03} \\ M_{10} & M_{11} & M_{12} & M_{13} \\ M_{20} & M_{21} & M_{22} & M_{23} \\ M_{30} & M_{31} & M_{32} & M_{33} \end{bmatrix} \begin{bmatrix} 1 \\ 0 \\ 0 \\ 1 \end{bmatrix} = \quad \text{Formula 4}$$

$$\begin{bmatrix} M_{00} + M_{03} - M_{20} - M_{23} \\ 0 \\ -M_{00} - M_{03} + M_{20} + M_{23} \\ 0 \end{bmatrix}$$

Figure 6:
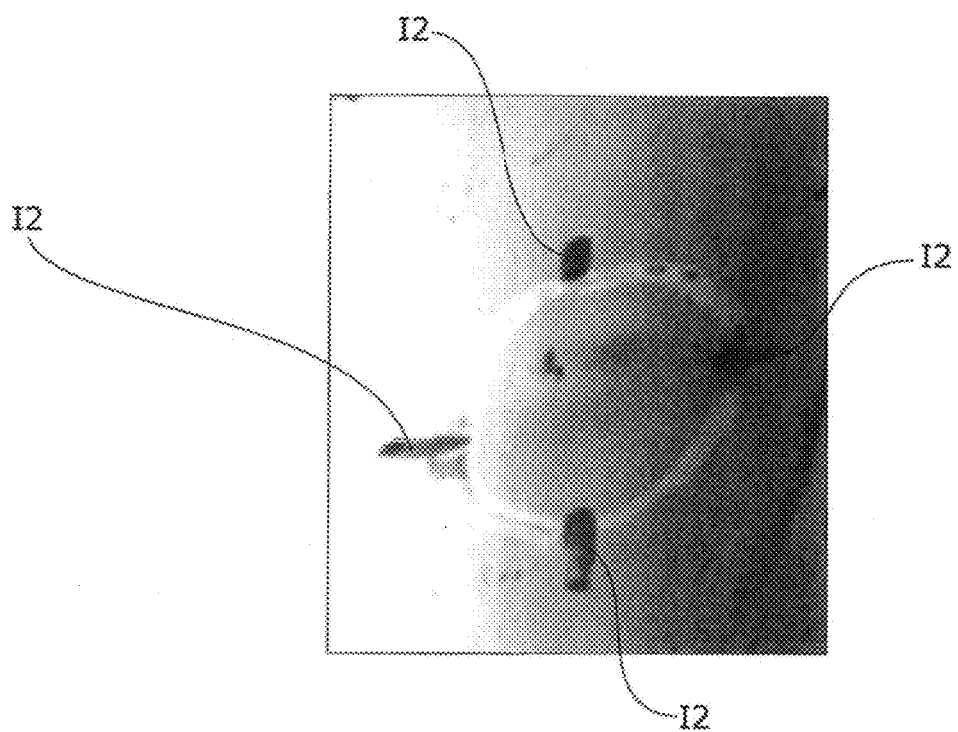
FIG. 6 is a view of an image captured by the polarizing film imaging apparatus according to the still other embodiment.

In the imaging apparatus 1 shown in FIG. 5, only $M_{30}$ component out of $M_{30}$ component and $M_{33}$ component of the Mueller matrix $M_f$ of the inspection film F is contained in $S_0$ component of the stokes parameter of light reaching the imaging unit 3, so that an inspection image (see FIG. 6) with irregularity, in which variations in light intensity due to the circular dichroism 12, is emphasized, is obtained. In FIG. 6, a reference code "12" is allocated to portions corresponding to irregularity.

The above embodiment was described for the imaging apparatus 1 that captures an image of the polarizing film F, but the imaging apparatus 1 may be connected with a defect detection unit 9 that detects a defect (a defect of the polarizing film F) appearing in an image captured by the imaging apparatus 1, as shown in FIG. 7. That is, the imaging apparatus 1 may be used as an inspection apparatus for the polarizing film F that includes the imaging apparatus 1 and the defect inspection unit 9.

In the above embodiment, the inspection film F is arranged to have its surfaces crossing the optical axis while being inclined thereto, but the present invention is not necessarily limited to this configuration. For example, the inspection film F may be arranged to have its surfaces crossing the optical axis while being orthogonal thereto.

In the above embodiment, the inspection film F is arranged to have its surfaces inclined to both the optical axis direction and the vertical direction, but the present invention is not necessarily limited to this configuration. When a direction orthogonal to both the optical axis direction and the vertical direction is designated as a depth direction, the inspection film F may have its surfaces inclined to, for example, both the optical axis direction and the depth direction.

REFERENCE SIGNS LIST

1: Imaging apparatus
2: Light source
3: Imaging unit
4: Circular polarizing plate
5: Wavelength plate
6: Analysis unit
7: Display unit
8: Polarizing plate
9: Defect detection unit
60: Extraction device
61: Processing device
62: Output device
F: Polarizing film (Inspection film)

What is claimed is:

1. A polarizing film imaging apparatus comprising:
 a light source that is configured to emit light toward a polarizing film to be inspected;
 a polarization camera that is arranged on an optical axis of the light source and on an opposite side to the light source with the polarizing film therebetween, and is configured to capture an image of transmitted light of the polarizing film; and
 a circular polarizing plate arranged between the light source and the polarizing film
 one wavelength plate arranged between the polarizing film and the polarization camera, the one wavelength plate being configured to shift a phase of incident light by ¼ wavelength; and
 an analysis unit configured to analyze information of the image captured by the polarization camera,
 wherein the polarizing film, the one circular polarizing plate, and the one wavelength plate are arranged so that the following Formula S, which represents a stokes parameter of light reaching the polarization camera that is determined by multiplying the following formula $S_c$ representing a stokes parameter of the one circular polarizing plate, the following formula $M_w$ representing a Mueller matrix of the one wavelength plate, and the following formula $M_f$ representing a Mueller matrix of the polarizing film, achieves that $S_{c0}$ component of the stokes parameter $S_c$ contains a component related to circular dichroism in the Mueller matrix $M_f$ of the polarizing film and $S_{c1}$ component of the stokes parameter $S_c$ contains a component related to birefringence of the Mueller matrix $M_f$ of the polarizing film, wherein the polarization camera is configured to obtain, as polarization information, information on polarized light beams having azimuth angles of 0°, 45°, 90°, and 135°, and wherein the analysis unit comprises:
an extraction device configured to extract, as characteristic information representing the polarization characteristics from the polarization information obtained by the polarization camera, light intensity, a difference in light intensity between a horizontal linearly polarized light component and a vertical linearly polarized light component, a difference in light intensity between a 45° linearly polarized light component and a 135° linearly polarized light component, and a difference in light intensity between a right-handed circularly polarized light component and a left-handed circularly polarized light component; and a processing device configured to newly generate an image produced by capturing an image of the polarizing film on the basis of the characteristic information.

$$S_c = \begin{bmatrix} 1 \\ 0 \\ 0 \\ 1 \end{bmatrix}$$

$$M_f = \begin{bmatrix} M_{00} & M_{01} & M_{02} & M_{03} \\ M_{10} & M_{11} & M_{12} & M_{13} \\ M_{20} & M_{21} & M_{22} & M_{23} \\ M_{30} & M_{31} & M_{32} & M_{33} \end{bmatrix}$$

$$M_W = \begin{bmatrix} 1 & 0 & 0 & 0 \\ 0 & 0 & 0 & -1 \\ 0 & 0 & 1 & 0 \\ 0 & 1 & 0 & 0 \end{bmatrix}$$

$$S = \begin{bmatrix} 1 & 0 & 0 & 0 \\ 0 & 0 & 0 & -1 \\ 0 & 0 & 1 & 0 \\ 0 & 1 & 0 & 0 \end{bmatrix} \begin{bmatrix} M_{00} & M_{01} & M_{02} & M_{03} \\ M_{10} & M_{11} & M_{12} & M_{13} \\ M_{20} & M_{21} & M_{22} & M_{23} \\ M_{30} & M_{31} & M_{32} & M_{33} \end{bmatrix} \begin{bmatrix} 1 \\ 0 \\ 0 \\ 1 \end{bmatrix} = \begin{bmatrix} M_{00} - M_{03} \\ M_{30} - M_{33} \\ M_{20} - M_{23} \\ M_{10} - M_{13} \end{bmatrix}$$

2. The polarizing film imaging apparatus according to claim 1, wherein the polarizing film is arranged to be inclined to the optical axis.

3. The polarizing film imaging apparatus according to claim 1, wherein the light of the light source has a wavelength of 400 nm to 500 nm, or 700 nm to 1000 nm.

4. A polarizing film inspection apparatus comprising:
the imaging apparatus of claim 1; and a processor which detects a defect of the polarizing film appearing in an image of the polarizing film captured by the imaging apparatus.

5. A polarizing film inspection method comprising:
obtaining an image of a polarizing film using the imaging apparatus according to claim 1; and
detecting a defect of the polarizing film appearing in the image of the polarizing film captured by the imaging apparatus.

\* \* \* \* \*